United States Patent
Karpetis et al.

(10) Patent No.: US 10,393,175 B2
(45) Date of Patent: Aug. 27, 2019

(54) FLUID BEARING SYSTEMS AND METHODS

(71) Applicant: THE TEXAS A&M UNIVERSITY SYSTEM, College Station, TX (US)

(72) Inventors: Adonios N. Karpetis, College Station, TX (US); Dean W. Ellis, College Station, TX (US); Yogesh Babbar, Hillsboro, OR (US); Moble Benedict, College Station, TX (US)

(73) Assignee: The Texas A&M University System, College Station, TX (US)

( * ) Notice: Subject to any disclaimer, the term of this patent is extended or adjusted under 35 U.S.C. 154(b) by 118 days.

(21) Appl. No.: 15/705,061

(22) Filed: Sep. 14, 2017

(65) Prior Publication Data

US 2018/0073560 A1 Mar. 15, 2018

Related U.S. Application Data

(60) Provisional application No. 62/394,626, filed on Sep. 14, 2016.

(51) Int. Cl.
*F16C 32/06* (2006.01)
*F16C 29/02* (2006.01)
*F16C 35/00* (2006.01)

(52) U.S. Cl.
CPC ........ *F16C 32/0622* (2013.01); *F16C 29/025* (2013.01); *F16C 35/00* (2013.01); *F16C 2326/00* (2013.01)

(58) Field of Classification Search
CPC .. B61B 1/02; B61B 3/00; B61B 13/00; B60V 1/00; B60V 1/11; F16C 32/06; B64B 1/02
See application file for complete search history.

(56) References Cited

U.S. PATENT DOCUMENTS

| | | | | |
|---|---|---|---|---|
| 5,909,710 A | * | 6/1999 | Cummins | B60V 3/04 104/23.2 |
| 6,082,478 A | * | 7/2000 | Walter | B60V 1/11 180/117 |
| 2004/0244633 A1 | * | 12/2004 | Witmer | B61B 13/04 104/93 |
| 2016/0229419 A1 | * | 8/2016 | Bambrogan | B61B 13/10 |
| 2018/0073560 A1 | * | 3/2018 | Karpetis | F16C 29/025 |

FOREIGN PATENT DOCUMENTS

KR 10-2001-0081160 A 8/2001

OTHER PUBLICATIONS

International Search Report and Written Opinion dated Dec. 22, 2017, for International Patent Application No. PCT/US2017/051638.

* cited by examiner

*Primary Examiner* — Jason C Smith
(74) *Attorney, Agent, or Firm* — Conley Rose, P.C.

(57) ABSTRACT

A fluid bearing includes a housing including an internal plenum disposed in the housing and an inlet in fluid communication with the plenum, wherein the inlet is configured to provide fluid to the plenum from an external source, a cushion surface facing away from the housing and the plenum, one or more nozzles positioned between the cushion surface and the housing, wherein the one or more nozzles extend from the plenum to the surrounding environment, wherein the one or more nozzles are configured to produce an annular curtain of fluid flowing at a velocity of at least Mach 1 and disposed about the cushion surface in response to a fluid flow entering the plenum from the inlet.

20 Claims, 10 Drawing Sheets

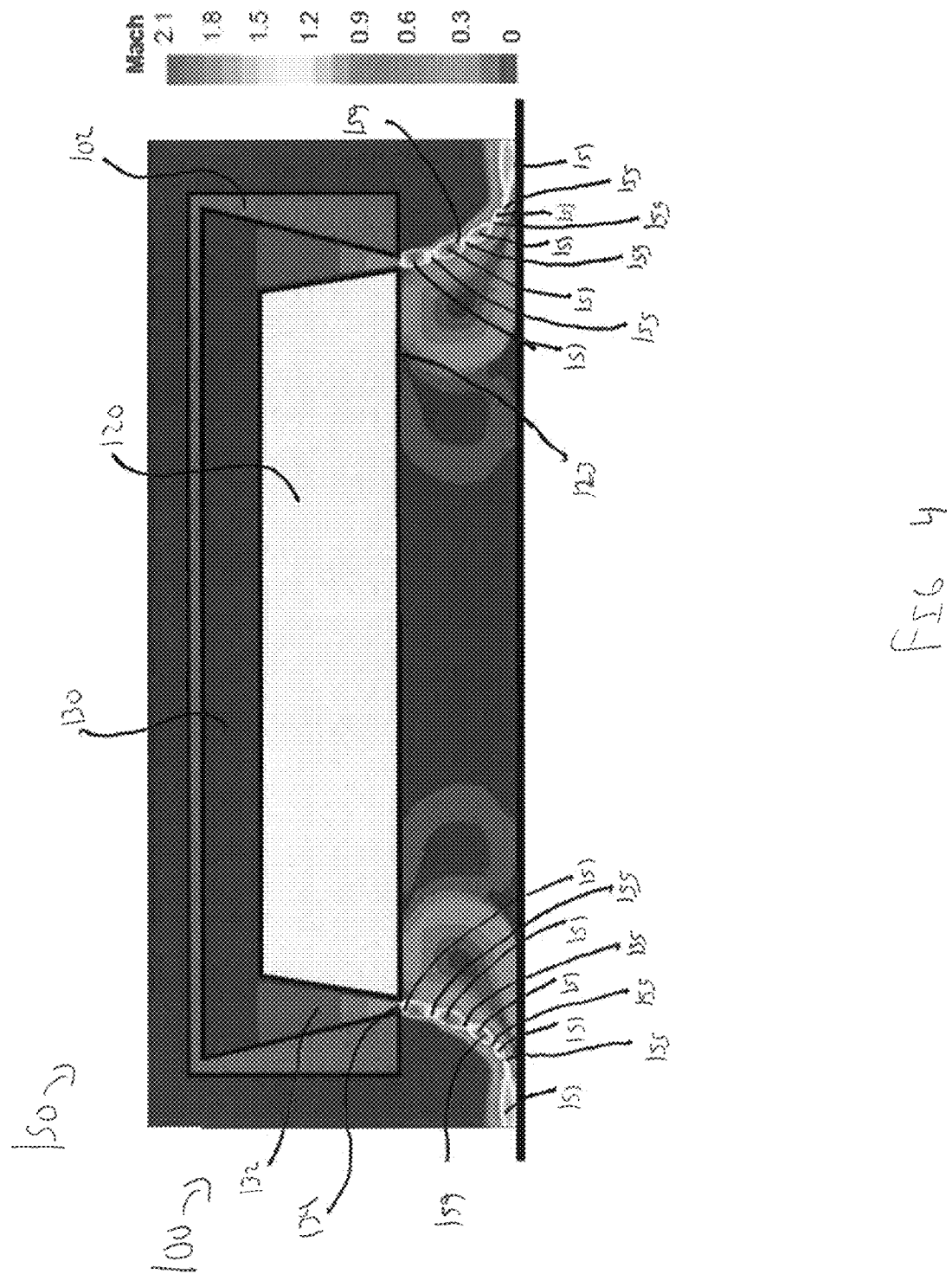

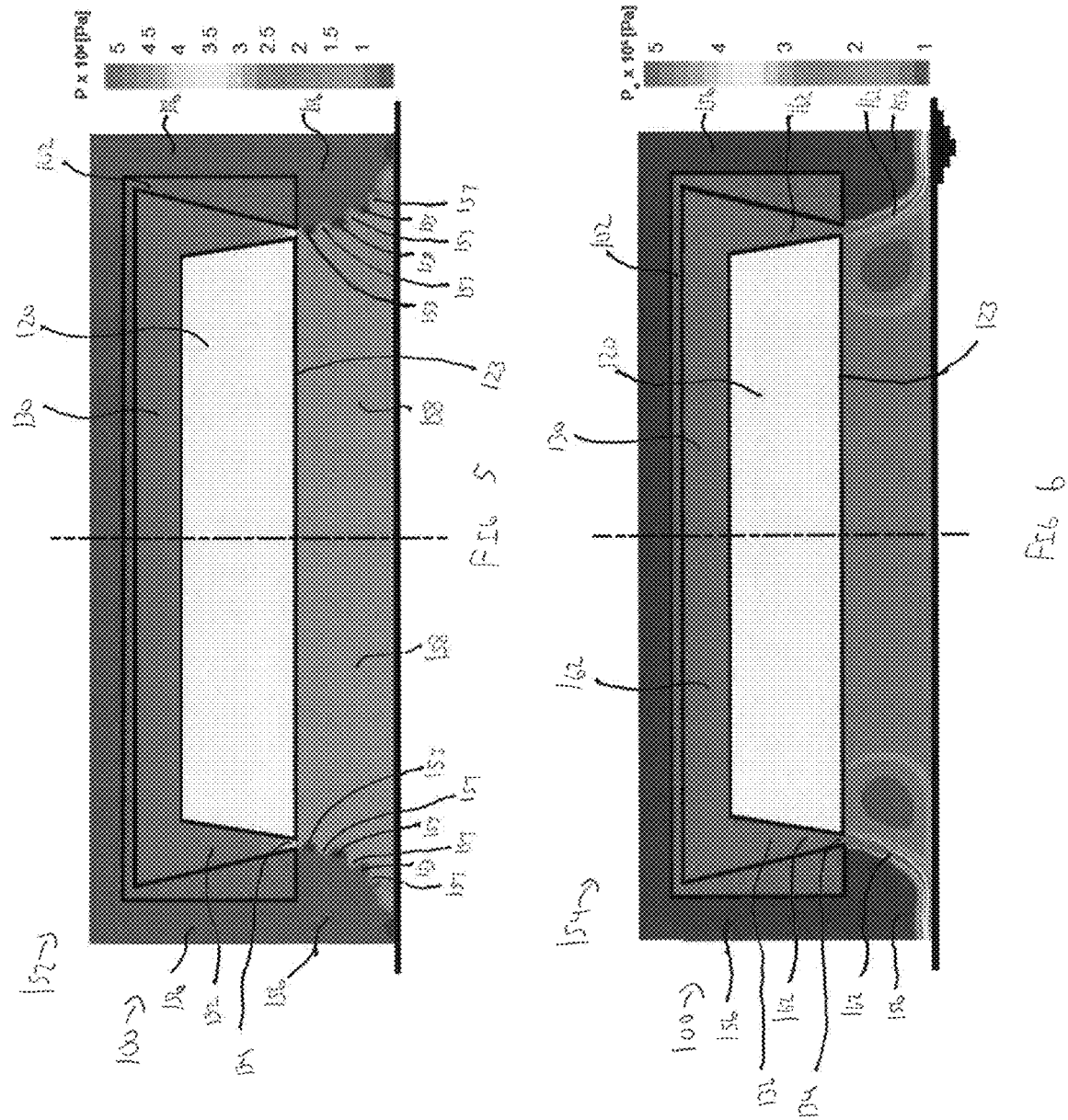

FLUID BEARING SYSTEMS AND METHODS

CROSS-REFERENCE TO RELATED APPLICATIONS

This application claims benefit of U.S. provisional patent application Ser. No. 62/394,626 filed Sep. 14, 2016, and entitled "Non-Contact Bearing Systems and Methods," which is hereby incorporated herein by reference in its entirety.

STATEMENT REGARDING FEDERALLY SPONSORED RESEARCH OR DEVELOPMENT

Not applicable.

BACKGROUND

This disclosure relates generally to bearing systems and methods. More particularly, this disclosure relates to non-contact, fluid bearing systems and methods.

Fluid bearing systems may be used in vehicular or transport systems, including high-speed transport systems for reducing friction between the moving vehicle and an adjacent surface over which the vehicle travels. For example, the Hyperloop system is a recent concept that has the potential to become a new, "fifth mode" of transportation, after the classic four: automobiles, trains, ships, and planes. The Hyperloop system may rely on the high-speed, near transonic movement of a vehicle or pod, resembling a train, in a tube that carries human passengers and/or cargo. Space requirements, cost arguments, and other practical considerations may limit the types of propulsion and the amount of thrust available for pod motion inside the tube. Therefore, for the Hyperloop system to come to fruition, all sources of drag resisting pod motion may be minimized. Two major sources of drag include aerodynamic drag, and rolling friction due to wheel contact. Aerodynamic drag may be addressed by evacuating the Hyperloop tube to low pressures, while rolling friction may be addressed by levitating the pod and thus eliminating contact friction altogether.

Levitation of a vehicle may be achieved by relying on electromagnetic means, i.e., by utilizing some type of inductive force generation, or arrangements of rotating magnets, as for example in the Halbach array. However, such devices require electrical power that is carried onboard (e.g. batteries), or is supplied to the moving pod from the ground. A second levitation method may employ gas (e.g., air, etc.) bearings that rely on the presence of compressed gas onboard the pod. One of the more significant problems of air bearing technology is the very small levitation height that can be generated for realistic gas pressure and flowrate conditions. In some applications, commercially available gas bearings may produce a levitation height on the order of few tens of micrometers (i.e., few thousands of an inch). This relatively minimal levitation height may be insufficient to support travel over rough or uneven terrain at high speeds.

BRIEF SUMMARY OF THE DISCLOSURE

An embodiment of a fluid bearing comprises a housing including an internal plenum disposed in the housing and an inlet in fluid communication with the plenum, wherein the inlet is configured to provide fluid to the plenum from an external source, a cushion surface facing away from the housing and the plenum, one or more nozzles positioned between the cushion surface and the housing, wherein the one or more nozzles extend from the plenum to the surrounding environment, wherein the one or more nozzles are configured to produce an annular curtain of fluid flowing at a velocity of at least Mach 1 and disposed about the cushion surface in response to a fluid flow entering the plenum from the inlet. In some embodiments, the one or more nozzles comprises an annular nozzle extending about the cushion surface. In some embodiments, the annular nozzle comprises a converging annular nozzle. In certain embodiments, the one or more nozzles comprises a plurality of circumferentially spaced nozzles disposed about the cushion surface. In certain embodiments, each of the plurality of circumferentially spaced nozzles is a converging-diverging nozzle. In certain embodiments, the fluid bearing further comprises an ignitor extending into the plenum, wherein the ignitor is configured to ignite the fluid entering the plenum. In some embodiments, the curtain of fluid is configured to provide an air cushion beneath the cushion surface that is at a pressure greater than the surrounding ambient pressure in response to a fluid flow entering the plenum from the inlet. In some embodiments, the curtain comprises a plurality of Mach diamonds. In certain embodiments, the fluid bearing further comprises a cushion member positioned in the plenum, wherein a bottom of the cushion member defines the cushion surface, and an actuator coupled to the cushion member and configured to adjust a lateral offset between a central axis of the cushion member and a central axis of the housing, wherein the central axis of the housing is oriented parallel to the central axis of the cushion member.

An embodiment of a hover vehicle for travelling over a surface comprises a chassis, a fluid source supported by the chassis, and a fluid bearing supported by the chassis and configured to produce an annular curtain of fluid flowing at a velocity of at least Mach 1 for levitating the hover vehicle above the surface in response to receiving fluid from the fluid source. In some embodiments, the fluid bearing comprises a housing comprising an internal plenum disposed in the housing and an inlet in fluid communication with the plenum and the fluid source, a cushion surface facing way from the housing and the plenum, and one or more nozzles positioned between the cushion surface and the housing, wherein the one or more nozzles extend from the plenum to the surrounding environment, wherein the one or more nozzles are configured to produce the annular curtain disposed about the cushion surface in response to a fluid flow entering the plenum from the inlet. In some embodiments, the hover vehicle further comprises a fuel source supported by the chassis, wherein the fluid bearing comprises a fuel inlet in fluid communication with the fuel source and an ignitor extending into the plenum, wherein the ignitor is configured to ignite the fluid and fuel in response to fuel and fluid entering the plenum. In some embodiments, the curtain of fluid is configured to provide an air cushion beneath the cushion surface that is at a pressure greater than the surrounding ambient pressure in response to a fluid flow entering the plenum from the inlet. In certain embodiments, the curtain of fluid comprises a plurality of Mach diamonds. In certain embodiments, the fluid bearing comprises a cushion member having a central axis and wherein a bottom of the cushion member defines the cushion surface, and an actuator coupled to the cushion member and configured to adjust a lateral offset between the central axis of the cushion member and a central axis of the housing, wherein the central axis of the housing is oriented parallel to the central axis of the cushion member, wherein the fluid bearing is configured to adjust an attitude of the vehicle in response to the actuator adjusting the lateral offset.

An embodiment of a method for levitating a vehicle travelling over a surface comprises suppling a fluid to an inlet of a fluid bearing of the vehicle, flowing the fluid into a plenum disposed in a housing of the fluid bearing, flowing the fluid through one or more nozzles extending from the plenum and into the surrounding environment, and ejecting the fluid from the one or more nozzles to form an annular curtain flowing at a velocity of at least Mach 1 and extending continuously around a cushion surface of the fluid bearing. In some embodiments, the method further comprises forming a fluid cushion enclosed by the curtain of fluid that is at a greater pressure than the surrounding ambient pressure. In some embodiments, the method further comprises forming a sonic jet comprising a plurality of alternating supersonic regions and subsonic regions. In certain embodiments, the method further comprises adjusting the attitude of the vehicle by adjusting a lateral offset between a central axis of a cushion member comprising the cushion surface and a central axis of the housing, wherein the central axis of the housing is oriented parallel to the central axis of the cushion member. In certain embodiments, the method further comprises igniting the fluid flowing into the plenum.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which:

FIGS. 4-6 are representations of separate computational fluid dynamics (CFD) analyses of the fluid bearing shown in FIGS. 2 and 3;

DETAILED DESCRIPTION OF DISCLOSED EMBODIMENTS

Figure 1:
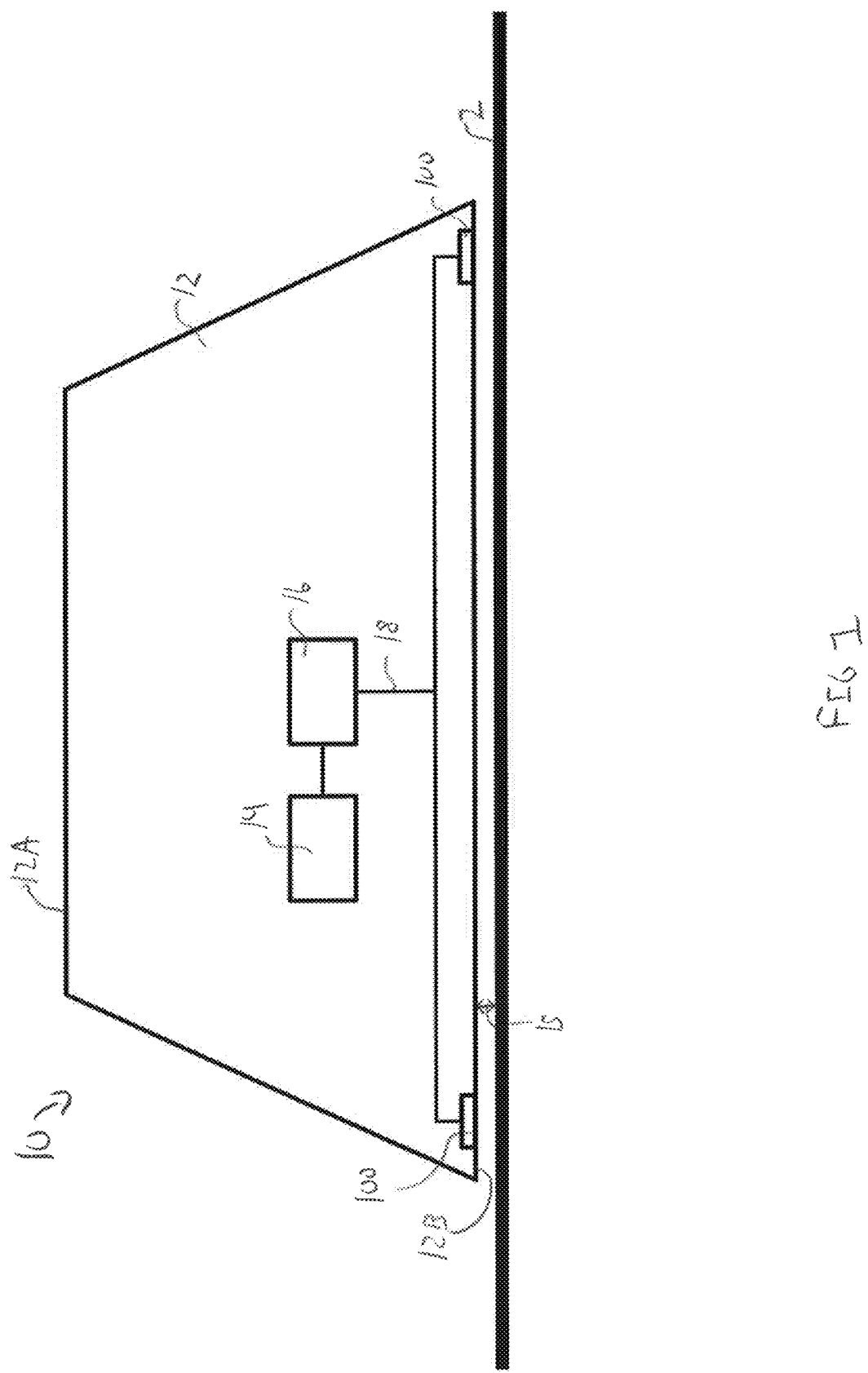
FIG. 1 is a schematic cross-sectional view of an embodiment of a vehicle comprising fluid bearings in accordance with principles disclosed herein.

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis.

Embodiments of the present disclosure generally relate to novel fluid (e.g., liquid, gas, or combinations thereof) bearings configured to support levitation at heights on the order of millimeters (e.g., 1-2 tenths of an inch), approximately 100 times higher than what may be accomplished by current air bearings. In some embodiments, the fluid gas bearing generates a sonic curtain of gas (e.g., air) that creates a high-pressure cushion isolated from the surrounding atmosphere. Embodiments of the present disclosure describe a levitation method at relatively large (e.g., 3-4 mm, etc.) heights. In some applications, the relatively large levitating height provided by the disclosed fluid bearings may enable friction-less levitation systems for vehicles, such as the proposed Hyperloop pod. The present disclosure offers a significant advance when compared to classic air bearings which can levitate at relatively small heights (e.g., 0.050-0.100 mm, etc.); the disclosed embodiments also compare favorably to current electromagnetic levitation systems, such as Halbach array devices which require batteries for levitation and hence incur a higher weight penalty. In some embodiments, the fluid bearings mimic a hovercraft by creating a supersonic curtain in place of the solid ones used by those devices. Embodiments disclosed herein allow for the levitation of a vehicle travelling at very high speeds (e.g., near sonic) over relatively rough terrains (e.g. 0.500 mm), which may be required in some vehicular applications, such as the Hyper loop system.

In some applications, traditional air bearings rely on extremely small levitation heights (e.g., 0.050-0.100 mm, etc.) for their operation. Particularly, this small height is necessary before a low-Reynolds number "creeping flow" can be established in the bearing gap, which in turn is responsible for the generation of lift and levitation. Increasing the levitation height may eliminate this effect in traditional air bearings, and may even create suction in place of lift. Therefore, past efforts to increase the levitation height of gas bearings by following the traditional air bearing design concept have been plagued by the "ground effect" issue. Alternative traditional designs for levitating a vehicle include hovercraft devices that rely on the presence of a solid, yet flexible curtain that creates air confinement and generates a small overpressure that ultimately leads to lift and levitation. Hovercraft systems generally travel at relatively slow velocities (i.e., 10-20 mph) and may be difficult to control. Embodiments disclosed herein dispense with the flexible curtain, and instead, utilize a supersonic curtain for confining gas underneath the bearing, which creates overpressure and lift. Further, unlike hovercraft applications that rely on a physical curtain, the disclosed embodiments are configured to allow for very high speed (e.g., 700 mph) travel. Additionally, disclosed embodiments are configured to provide the largest possible area underneath the gas bearings to maximize lift, and are also configured to operate via the presence of a continuous supersonic curtain.

As described above, the present disclosure relates generally to the generation of a sonic/supersonic curtain that creates a region of confinement and overpressure, ultimately resulting in lift and levitation. In some embodiments, high-pressure gas is fed into a plenum and then is ejected through a converging, or converging-diverging nozzle creating a sonic/supersonic jet. If the jet forms a closed surface, the enclosed area of confinement may be at a higher pressure than the local atmosphere, resulting in overpressure, lift, and hovering. The levitation height may be related to the size and number of supersonic jet features known in the art as "Mach diamonds," which are in turn may be related to the ratio of pressures between the plenum and atmosphere, as well as the size of the gap creating the jet.

Referring to FIG. 1, an embodiment of a hover vehicle 10 for travelling over a surface 2 and including fluid or gas bearings 100 is shown. In the embodiment of FIG. 1, vehicle 10 generally includes a support structure or chassis 12, a power source 14, a gas or fluid source 16, and a plurality of fluid bearings 100. Chassis 12 has an upper end or top 12A, a lower end or bottom 12B, and physically supports the power source 14 and gas source 16. In some embodiments, chassis 12 is also configured to physically support passengers of vehicle 10 and/or cargo as vehicle 10 is transported over surface 2. Gas source 16 comprises a source or storage tank of compressed gaseous fluid. In this embodiment, gas source 16 comprises air; however, in other embodiments, gas source 16 may store other gasses. Power source 14 supplies power to gas source 16 for compressing the gas stored therein and providing the gas as needed to fluid bearings 100 via gas supply lines 18. In some embodiments, power source 14 provides power for other components of vehicle 10.

Fluid bearings 100 are positioned at or proximate to the bottom 12B of chassis 12 and are configured to, upon actuation, levitate vehicle 10 at a levitation height 15 from the surface 2 as vehicle 10 travels over surface 2. In some embodiments, fluid bearings 100 levitate vehicle 10 at a levitation height 15 of one millimeter (mm) or more (e.g., 2-5 mm, etc.) over surface 2. In certain embodiments, fluid bearings 100 levitate vehicle 10 at a levitation height 15 of one mm or more as vehicle 10 travels at high speeds (e.g., near sonic) over relatively rough terrain (e.g., roughness value of 0.5 mm).

Figure 2:
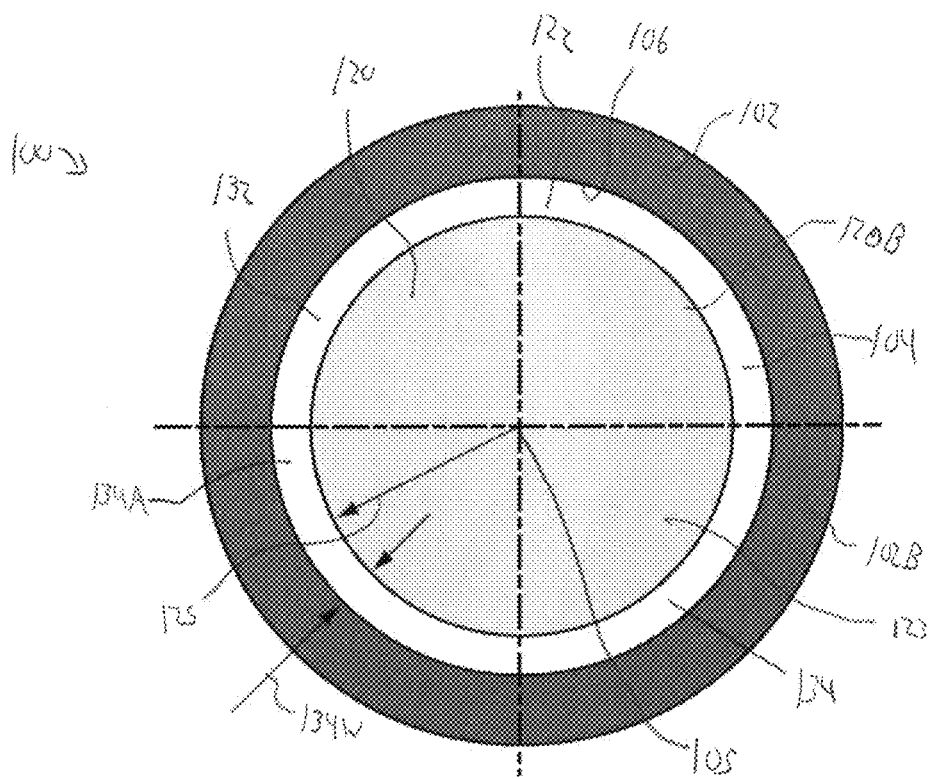
FIG. 2 is a bottom view of one of the fluid bearings of the vehicle of FIG. 1.
Figure 3:
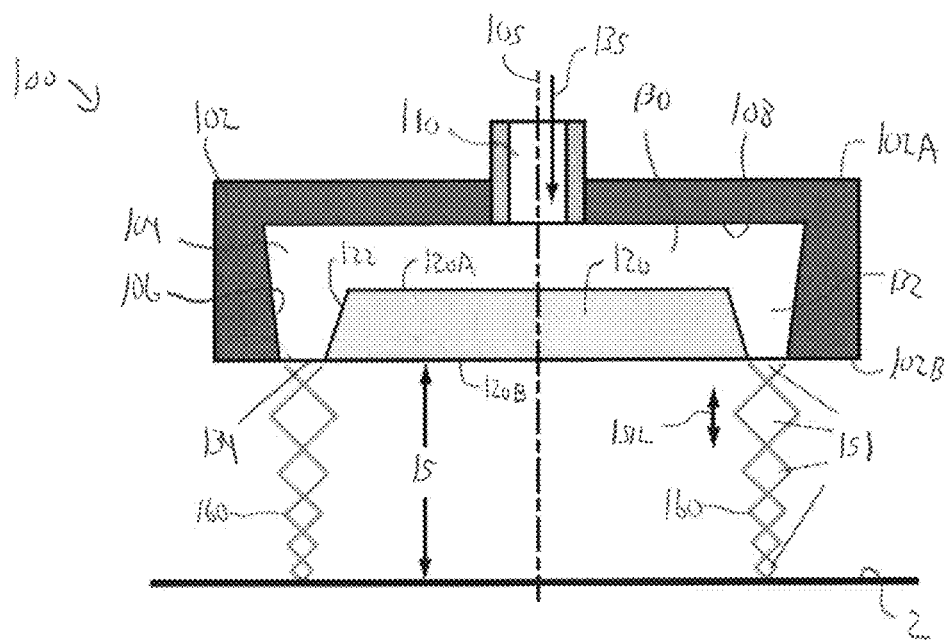
FIG. 3 is a side cross-sectional view of the fluid bearing of FIG. 2.

Referring to FIGS. 2 and 3, one fluid or gas bearing 100 of vehicle 10 is shown with the understanding the other bearings 100 of vehicle 10 are the same. In this embodiment, fluid bearing 100 has a central axis 105 and generally includes a cylindrical outer housing 102 and a cylindrical cushion member 120. In some embodiments, housing 102 and cushion member 120 comprise a single, integrally or monolithically formed member; however, in other embodiments, housing 102 and cushion member 120 comprise separate members that are coupled together to form fluid bearing 100. In this embodiment, housing 102 has a first or upper end 102A, a second or lower end 102B, and a central chamber 104 extending into housing 102 from lower end 102B and defined by a frustoconical inner surface 106. Chamber 104 of housing 102 terminates therein at a terminal end 108. In this embodiment, inner surface 106 has a negative draft geometry in which the radius of frustoconical inner surface 106 (measured perpendicular to axis 105) decreases moving axially away from terminal end 108 to lower end 102B. Additionally, housing 102 includes a gas inlet 110 at upper end 102A that is in fluid communication with chamber 104.

Cushion member 120 of fluid bearing 100 has a first or upper end 120A, a second or lower end 120B, and a frustoconical outer surface 122 extending between ends 120A, 120B. In this embodiment, cushion member 120 is affixed to housing 102 such that relative rotational and/or translational movement between cushion member 120 and housing 102 is restricted. In some embodiments, elongate members or spokes extend axially between first end 120A of cushion member 120 and the terminal end 108 of chamber 104 to couple cushion member 120 with housing 102. In other embodiments, elongate members or spokes extend radially between outer surface 122 of cushion member 120 and inner surface 106 of housing 102. The radius of outer surface 122 (measured perpendicular to axis 105) increases moving from upper end 120A to lower end 120B. In this embodiment, lower end or bottom 120B of cushion member 120 defines a cushion surface of fluid bearing 100. Central axis 105 of fluid bearing 100 extends perpendicularly to cushion surface 120B. A generally cylindrical plenum 130 defined by inner surface 106 of housing 102 is formed or disposed in chamber 104, where plenum extends axially between terminal end 108 of chamber 104 and the upper end 120A of cushion member 120. Cushion surface 120B of fluid bearing 100 faces away from plenum 130. Additionally, an annular nozzle 132 is also formed in chamber 104 of housing 102, where nozzle 132 extends axially between the upper end 120A of cushion member 120 and the lower ends 102B, 120B, of housing 102 and cushion member 120, respectively. Annular nozzle 132 is positioned between cushion surface 120B and housing 102. A radially outer end of annular nozzle 132 is defined by the inner surface 106 of housing 102 while a radially inner end of annular nozzle 132 is defined by the outer surface 122 of cushion member 120. Given that inner surface 106 and outer surface 122 each comprise frustoconical surfaces, the radial width of annular nozzle 132 (measured perpendicular to axis 105) gradually decreases from a maximum located axially at the upper end 120A of cushion member 120 to a minimum located axially at the lower ends 102B, 120B, of housing 102 and cushion member 120, respectively. Thus, in this embodiment, annular nozzle 132 comprises a converging nozzle. The converging width of annular nozzle 132 forms an annular exit or throat 134 between the lower ends 102B, 120B of housing 102 and cushion member 120, respectively.

During operation of vehicle 10 and fluid bearing 100, pressurized gas is provided to fluid bearings 100 via gas supply 16 and gas supply lines 18. Gas flow into plenum 130 via gas inlet 110 of housing 102 (indicated by gas flowpath arrow 135) where pressure in plenum 130 ($P_o$) is maintained at stagnation pressure. The pressure $P_o$ in plenum 130 is higher than the atmospheric pressure $P_a$. Gas disposed in plenum 130 flows through annular nozzle 132 and exits chamber 104 of housing 102 via throat 134. The pressure differential between the pressure $P_o$ in plenum 132 and atmospheric pressure $P_a$ produces the fluid flow from plenum 130 to throat 134, where the pressure of the gas as it flows through throat 134 may be obtained through isentropic calculations. For instance, and not being bound by any particular theory, the pressure ($P_e$) of gas exiting throat 134 may be calculated according to equation (1) presented below:

$$p_e = p_t = p^* = p_o \left(\frac{2}{\gamma+1}\right)^{\frac{\gamma}{\gamma-1}} \quad (1)$$

If the pressure $P_o$ in plenum 130 is large enough, choking (e.g., a sonic condition) is obtained at throat 134, where the Mach number M (e.g., in this embodiment, Mach number M=u/a where u is the local flow speed and a equals the local speed of sound) becomes unity and pressure in throat 134 attains the critical value P* where γ of equation (1) is the heat capacity ratio ($c_p/c_v$). When a choked flow is produced through throat 134, the pressure in throat 134 is also greater than atmospheric pressure $P_a$.

Referring to FIGS. 4-6, representations of separate CFD analyses of gas flow through fluid bearing 100 are shown. Particularly, an exemplary axisymmetric flow simulation 150 illustrating the Mach number of the gas flow is shown in FIG. 4, an exemplary turbulent flow simulation 152 illustrating the pressure of the gas flow is shown in FIG. 5, and an exemplary compressible flow simulation 154 illustrating the total (stagnation) pressure distribution is shown in FIG. 6. In this embodiment, flow simulations 150, 152, and 154 are produced using the Fluent software tool provided by ANSYS; however, in other embodiments, other CFD software tools may be used to produce flow simulations, 150, 152, 154. In this embodiment, flow simulations 150, 152, 154 include gas compressibility and turbulent flow models configured to capture the gas flow through fluid bearing 100 in a realistic fashion. Additionally, in performing flow simulations 150, 152, 154, a wide variety of operating parameters were explored, including gas composition, the annular area 134A (shown in FIG. 2) of throat 134, the annular width 134W (shown in FIG. 2) of throat 134, a cushion area 123 (shown in FIG. 2) comprising the area of the lower end 120B of cushion member 120, a cushion radius 125 (shown in FIG. 2) comprising the radius extending between central axis 105 and the outer surface 122 of cushion member 120 at lower end 120B, levitation height 15, stagnation pressure $P_o$ of plenum 130, as well as other factors. For instance, in an embodiment, the cushion radius 125 ranges approximately from 50 mm to 760 mm, the pressure $P_o$ in plenum 130 ranges from the pressure P* where choking occurs up to approximately 150 pounds per square inch (PSI), the annular width 134W ranges approximately from 25 micrometers to 5 mm, and levitation height 15 ranges from approximately 15 micrometers to 125 mm. However, the flow simulations 150, 152, and 154 are exemplary and may change in result of changes to the above described operating parameters, as well as to changes in other factors.

In this embodiment, the gas flow exiting throat 134 of fluid bearing 100 (illustrated by flow simulations 150, 152, and 154) first expands to a supersonic condition (M>1) in a supersonic region forming a supersonic structure or Mach diamond 151 (shown in FIGS. 3 and 4) through a Prandtl-Meyer expansion fan in a sub-atmospheric pressure region (e.g., $P<P_a$) 153 (shown in FIG. 5). As the gas travels farther from throat 134 it develops shock waves, including oblique and normal shock waves, which produce a subsonic condition (M<1) in a subsonic region 155 (shown in FIG. 4) in a supra-atmospheric pressure region (e.g., $P>P_a$) 157 (shown in FIG. 5). In some embodiments, this flow process may continue for a number of iterations along the gas flowpath extending from throat 134 to the surface 2, ultimately forming a flow pattern resembling, for instance, the exhaust of a jet engine or rocket nozzle. Thus, flow simulation 150 includes a plurality of alternating Mach diamonds 151 and subsonic regions 155 and flow simulation 152 includes a plurality of alternating sub-atmospheric pressure regions 153 (coinciding in location with Mach diamonds 151) and supra-atmospheric pressure regions 157 (coinciding in location with subsonic regions 155).

Flow simulation 150 of FIG. 4 also indicates the presence of an annular sonic or supersonic line or jet (e.g., M≥1) 160 extending continuously between throat 134 and surface 2 (encapsulating Mach diamonds 151 and subsonic regions 155), which forms an annular sonic or supersonic curtain 159 (e.g., fluid velocity equal to at least Mach 1) (shown in FIG. 5) extending between throat 134 and surface 2. Particularly, an upper end of supersonic curtain 159 located at, or proximal to, throat 134 extends about the cushion area 123 of cushion member 120, and increases in diameter moving from the upper end of supersonic curtain 159 to a lower end of supersonic curtain 159 located at, or proximal to, surface 2. Additionally, an inner radius or "surface" of supersonic curtain 159 extends convexly between the upper and lower ends of supersonic curtain 159, and thus, supersonic curtain 159 increases in diameter nonlinearly moving from the upper end of supersonic curtain 159 to the lower end thereof. Flow simulation 152 of FIG. 5 also indicates the separation produced by the supersonic curtain 159 between an atmospheric pressure region 156 surrounding supersonic curtain 159 and the housing 102 of fluid bearing 100, and a generally cylindrical supra-atmospheric pressure region 158 extending between the lower end 120B of cushion member 120 and the surface 2 and contained within the supersonic curtain 159. In certain embodiments, the pressure differential between supra-atmospheric pressure region 158 and the surrounding atmospheric pressure region 156 applies a lifting force against the lower end 120B of cushion member 120 to thereby levitate fluid bearing 100 (as well as vehicle 10) at the levitation height 15.

In some embodiments, the amount of lifting force produced by fluid bearing 100 depends on the degree of total (stagnation) pressure inside plenum 130. Flow simulation 154 indicates a maximum total or stagnation pressure region 162 that extends throughout plenum 130, nozzle 132 (including throat 134), and the supersonic curtain 159 extending between throat 134 and a location at, or proximate to, the surface 2. The maximum total pressure region 162 is substantially uniform or constant in total pressure throughout, and in this embodiment, comprises approximately five atmospheres (e.g., approximately 73.5 PSI). Turbulent shear layers develop parallel to the supersonic curtain 159, forming an interaction region between supersonic curtain 159 and its subsonic surroundings. The turbulent shear layers slowly decrease the value of total pressure along a longitudinal axis of supersonic curtain 159 until the supersonic curtain 159 can no longer be formed by Prandtl-Meyer expansions. The local total pressure at the lower end of supersonic curtain 159 drops below the maximum total pressure 162, thus terminating supersonic curtain 159. In this embodiment, levitation height 15 depends on the axial length of supersonic curtain 159 (e.g., the length between upper and lower ends of curtain 159), with an increase in axial length of supersonic curtain 159 resulting in a corresponding increase in levitation height 15. Thus, in this embodiment, levitation height 15 may be defined by the location in space where total pressure losses in supersonic curtain 159 to the turbulent boundary layers and oblique shock waves have reached the center of supersonic curtain 159.

In some embodiments, the number of Mach diamonds 151, and their overall length and width, depend on the maximum level of overpressure encountered at throat 134, and ultimately, an overpressure ratio between maximum total pressure region 162 and atmospheric pressure region 156 (e.g., $P_o/P_a$). In certain embodiments, the flow pattern of alternating supersonic (e.g., Mach diamonds 151) and subsonic regions 155 is separated from the surroundings everywhere by the sonic line 160, or in other words, by a regions of sonic flow where M=1). Not being bound by any particular theory, the presence of the sonic line 160 implies that information or knowledge of the flow may be communicated from the low-speed surroundings (e.g., atmospheric pressure region 156) to the interior (e.g., supra-atmospheric pressure region 158) of the jet flow. In other words, the pressure of supra-atmospheric pressure region 158 is unaffected by the atmospheric pressure of atmospheric pressure region 156. Thus, by shaping the supersonic flow in a closed pattern, thereby forming supersonic curtain 159, the atmospheric pressure of atmospheric pressure region 156 cannot be communicated through supersonic curtain 159 to the supra-atmospheric pressure region 158. In this manner, supersonic curtain 159 separates a region of high pressure (e.g., supra-atmospheric pressure region 158) to the lower atmospheric pressure (e.g., atmospheric pressure region 156). In some embodiments, cushion area 123 of cushion member 120 forms a surface from which the cushion of gas disposed in supra-atmospheric pressure region 158 may act against to lift fluid bearing 100 to a levitation height 15 of at least 15 micrometers. In some embodiments, the levitation height ranges between 15 micrometers to 125 mm. Thus, supersonic curtain 159 functions in a similar manner as a fluidic or aerodynamic analogue to the solid, flexible curtain used in hovering ground vehicles ("hovercrafts"), thereby mitigating the problems of low speed and inadequate stability of those devices.

In some embodiments, throat area 134A is sized to be small enough to secure choking at throat 134, and thus, ensuring the development of a supersonic flow. Not being bound by any particular theory, throat area 134A may also be related to the mass flowrate ($\dot{m}$) of the gas flow, which forms supersonic curtain 159, as depicted in equation (2) below, where R is the specific gas constant, $T_o$ the total (stagnation) temperature of the gas in plenum 130, and $A_e$ is throat area 134A:

$$\dot{m} = \frac{A_e p_o \gamma}{(\gamma R T_o)^{1/2}} \left(\frac{2}{\gamma + 1}\right)^{\frac{\gamma+1}{2(\gamma-1)}} \quad (2)$$

In this embodiment, the mass flowrate $\dot{m}$ of gas is provided by gas source 16, where gas source 16 has sufficient capacity to accommodate the continuous loss of gas $\dot{m}$ while supplying gas to fluid bearing 100 at high pressure (e.g., having a total pressure equal to pressure in maximum total pressure region 162). Throat area 134A may be related to throat width 134W by simple geometry ($A_e \approx 2\pi r_c l_e$), where $r_c$ refers to cushion radius 125 and $l_e$ refers to throat width 134W. In some embodiments, and not being bound by any particular theory, a length 151L (shown in FIG. 3) of each Mach diamond 151 is related linearly to throat width 134W, as can be seen from simple experimental correlations valid for supersonic air jets and the following equation (3) shown below, where L refers to Mach diamond length 151L:

$$L \simeq l_e \sqrt{\frac{p_o}{p_a} - 1.9} . \quad (3)$$

In some embodiments, levitation height 15 is associated with the presence of supersonic curtain 159, and the formation of supersonic curtain 159 depends on the formation of Mach diamonds 151. Further, in some embodiments, the total number of Mach diamonds 151 and their respective lengths 151L depend on the overpressure ratio between maximum total pressure region 162 and atmospheric pressure region 156 (e.g., $P_o/P_a$). Additionally, levitation height 15 may increase with an increase in the overpressure ratio due to an increase in number of Mach diamonds 151 and an increase in their respective lengths 151L. In certain embodiments, altering throat width 134W may also affect levitation height 15 in a number of ways. For instance, if throat area 134A is held constant to keep the mass flowrate $\dot{m}$ through fluid bearing 100 constant, while throat width 134W is increased to increase the levitation height 15, the cushion radius 125 of cushion area 123 must decrease as a result, with a concomitant decrease in overall lift produced by fluid bearing 100. In other words, and has been verified by CFD analyses, under a constant mass flowrate $\dot{m}$ being supplied to fluid bearing 100, bearing 100 will hover at a levitation height 15 that is inversely proportional to the lift generated by fluid bearing 100.

Figure 7:
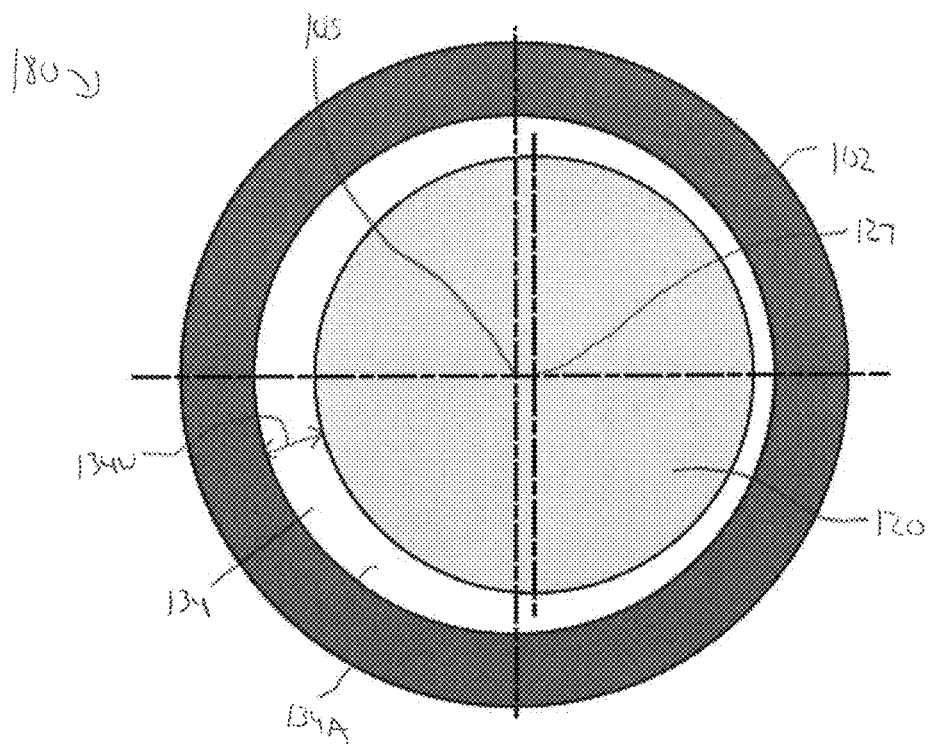
FIG. 7 is a bottom view of an embodiment of a fluid bearing in accordance with principles disclosed herein that can be used in the vehicle of FIG. 1.
Figure 8:
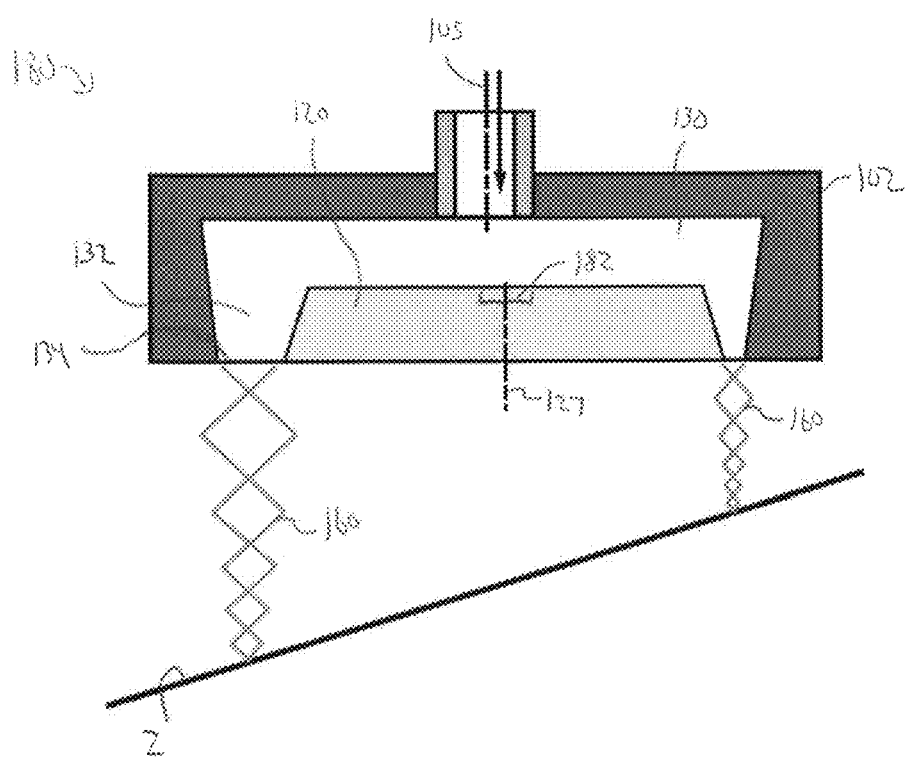
FIG. 8 is a side cross-sectional view of the fluid bearing of FIG. 7.

Referring to FIGS. 7 and 8, another embodiment of a fluid or gas bearing 180 that can be used in connection with vehicle 10 (e.g., in place of bearing 100) is shown. Fluid bearing 180 includes features in common with fluid bearing 100 shown in FIGS. 2-6, and shared features are labeled similarly. Particularly, in the embodiment of FIGS. 7, 8, fluid bearing 180 includes an actuator 182 configured to displace cushion member 120 relative to housing 102. Particularly, actuator 182 is configured to move cushion member 120 laterally relative to housing 102 such that a central axis 127 of cushion member 120 (axis 127 extending perpendicularly relative to cushion surface 120B) may become radially or laterally offset from a central axis 105 of housing 102, where central axis 127 of cushion member 120 is oriented parallel to central axis 105 of housing 102. Misalignment between axes 127 and 105 causes the width 134W of throat 134 to vary in size along the circumference of throat 134.

Although, in this embodiment, width 134W of throat 134 may not be uniform along the circumference of throat 134, supersonic curtain 159 may still be maintained along the entire circumference of throat 134 even when central axis 127 of cushion member 120 is laterally offset from central axis 105 of housing 102. Thus, in other embodiments that do not include actuator 182, diverse or non-symmetrical shapes may be used when forming housing 102 and cushion member 120 to conform with varying vehicular requirements.

In this embodiment, throat exit area 134A and the mass flowrate ṁ through fluid bearing 180 may be minimized. The length 151 of each Mach diamond 151 may also change as a result of equation (3), and consequently the overall levitation height 15 may also depend on the local throat width 134W. As shown particularly in FIG. 8, the non-uniform throat width 134W varies the attitude of fluid bearing 180 with respect to the surface 2, thus allowing for pitch and roll control of vehicle 10 using fluid bearing 180. In other embodiments, instead of changing throat width 134W, a similar effect may be obtained by directing the sonic line 160 at an angle with respect to central axis 105, thus effectively lowering part of fluid bearing 180. In some embodiments, these methods of pitch control may be implemented in real time using a closed loop controller configured to sense or measure the attitude of fluid bearing 180 (e.g. using a laser sensor, etc.) and correct the attitude by pushing one component of fluid bearing 180 to one side (via actuator 182), thereby changing the throat width 134W locally, or rotating cushion member 120 of fluid bearing 180 in such a way as to change the angle of supersonic curtain 159 and thereby change the levitation height 15.

In other embodiments, gasses other than air may be fed to the fluid bearings (e.g., bearings 100, 180) of vehicle 10. For instance, equation (2) above illustrates the dependence of the mass flowrate ṁ on the type of gas via the effects of γ and the molecular weight (MW) of the gas, where the specific gas constant R is related to the universal gas constant $R_U$ by the simple formula $R=R_U/MW$, which shows that R increases with decreasing MW creating a number of operating possibilities. For example, while keeping the mass flowrate (ṁ, kg/s of gas) and throat area 134A fixed, reducing the MW of the gas, such as by substituting Helium (MW=4) for air, allows for an increase in pressure in the maximum total pressure region 162 and an increase in the overpressure ratio, providing an increased levitation height 15.

Figure 9:
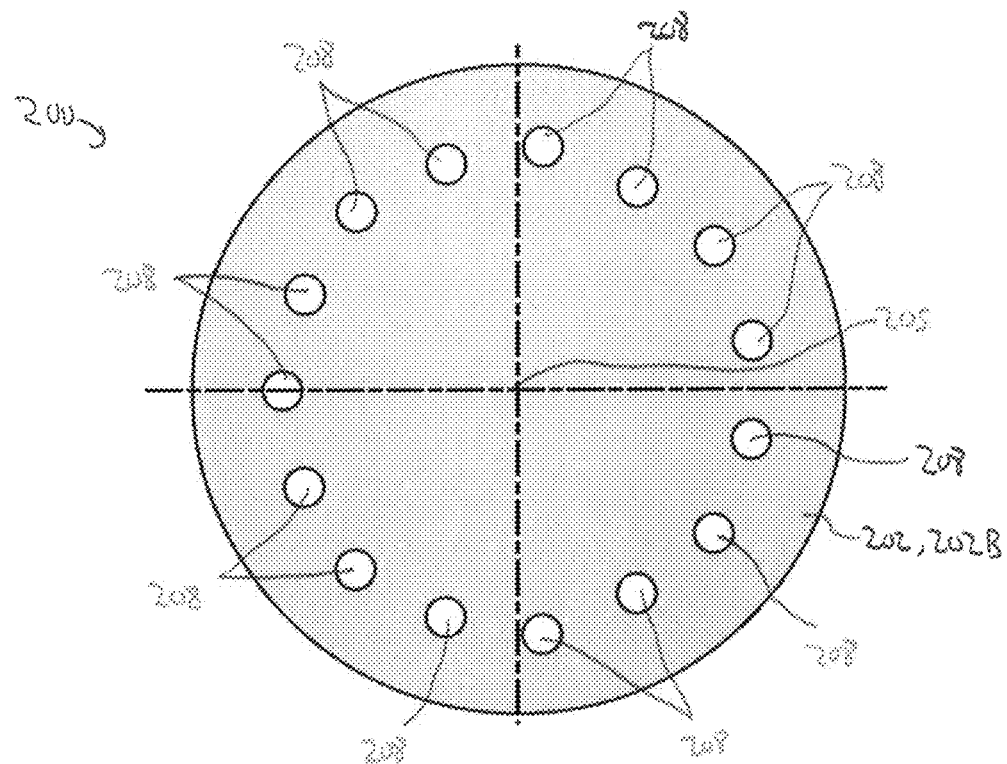
FIG. 9 is a bottom view of an embodiment of a fluid bearing in accordance with principles disclosed herein that can be used in the vehicle of FIG. 1.
Figure 10:
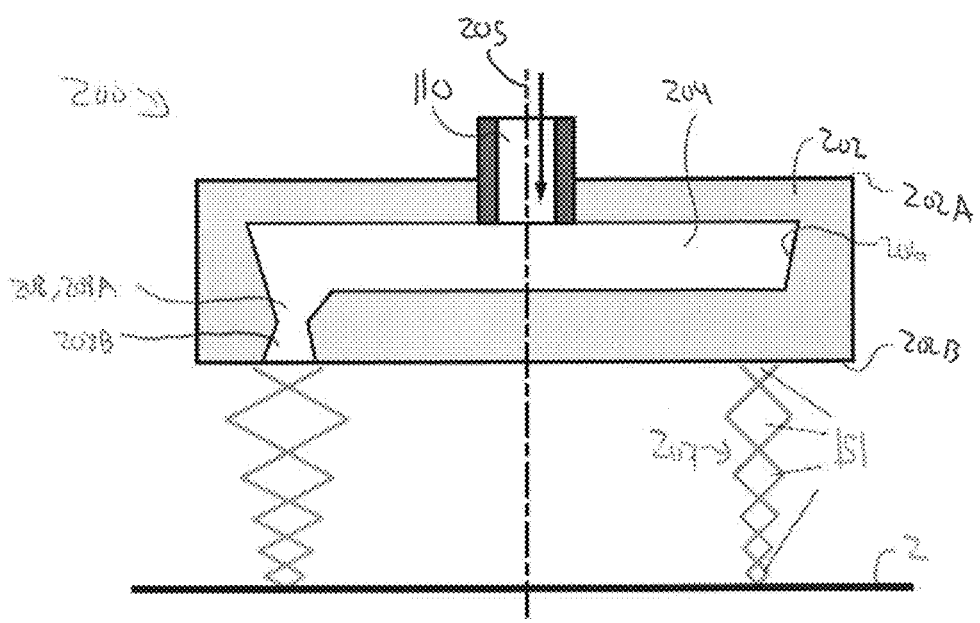
FIG. 10 is a side cross-sectional view of the fluid bearing of FIG. 9.

Referring to FIGS. 9 and 10, another embodiment of a fluid or gas bearing 200 that can be used in connection with vehicle 10 (e.g., in place of bearing 100) is shown. Fluid bearing 200 includes features in common with fluid bearing 100 shown in FIGS. 2-6, and shared features are labeled similarly. In the embodiment of FIGS. 9, 10, fluid bearing 200 has a central axis 205 and generally includes a housing 202 having a first or upper end 202A, a second or lower end 202B, and a central cylindrical chamber or plenum 204 disposed therein and defined by a frustoconical inner surface 206. Central axis 205 of fluid bearing 200 extends perpendicularly relative to lower end 202B of housing 202. In this embodiment, lower end 202B of housing 202 comprises a cushion surface of fluid bearing 200. Housing 202 also includes a plurality of circumferentially spaced nozzles 208 extending axially between plenum 204 and the lower end 202B of housing 202. Each nozzle 208 includes a converging section 208A extending from plenum 204, and a diverging section 208B extending from a lower end of the converging section 208A to the lower end 202B of housing 202. Thus, each nozzle 208 comprises a converging-diverging nozzle 208.

In this embodiment, supersonic curtain 159 comprising Mach diamonds 151 may be formed without having a continuous throat 134. Instead, each nozzle 208 creates a sonic or supersonic jet 207 extending between nozzle 208 and the surface 2. The Mach diamonds 151 emanating from each nozzle 208 may interact with the Mach diamonds 151 of adjacently positioned nozzles 208 due to the relatively close circumferential spacing of nozzles 208, potentially allowing for the formation of the enclosed supersonic curtain. In this embodiment, fluid bearing 200 may be configured such that jets 207 each comprise Mach diamonds 151 having a relatively large diameter to assist with potentially creating interactions between the Mach diamonds 151 of different nozzles 208. In some embodiments, large Mach diamonds 151 are formed by employing a relatively large overpressure ratio with a simple converging channel, or, as is shown in FIG. 4, by forming each nozzle 208 to include a converging-diverging shape.

Embodiments of fluid bearings described herein may comprise a simple converging channel/nozzles (e.g., nozzle 132 of fluid bearing 100) configured to create an under-expanded jet structure immediately after exiting throat 134, a converging-diverging channel/nozzles (e.g., converging-diverging nozzles 208 of fluid bearing 200) configured to create an over-expanded jet structure at its exit, a channel/nozzles configured to create a perfectly expanded jet structure at its exit. Each of these cases may form a supersonic jet comprising Mach diamonds that alternate in character between over-expanded and under-expanded regions. Thus, the choice of channel shape may be dictated by the required exit pressure condition ($P_e$) (e.g., the pressure at throat 134 or the exit of nozzles 208, etc.) as well as the necessary size of the supersonic structures required for the particular application. The use of nozzles 208 in this embodiment provides the benefit of creating supersonic curtain 159 through a smaller total exit area (e.g., the total exit area of the exits of nozzles 208), which may reduce the gas flow rate required for producing a fixed maximum total pressure 162 (total pressure in plenum 204, in this embodiment) and fixed levitation height 15, as predicted by equation (2) above.

Figure 11:
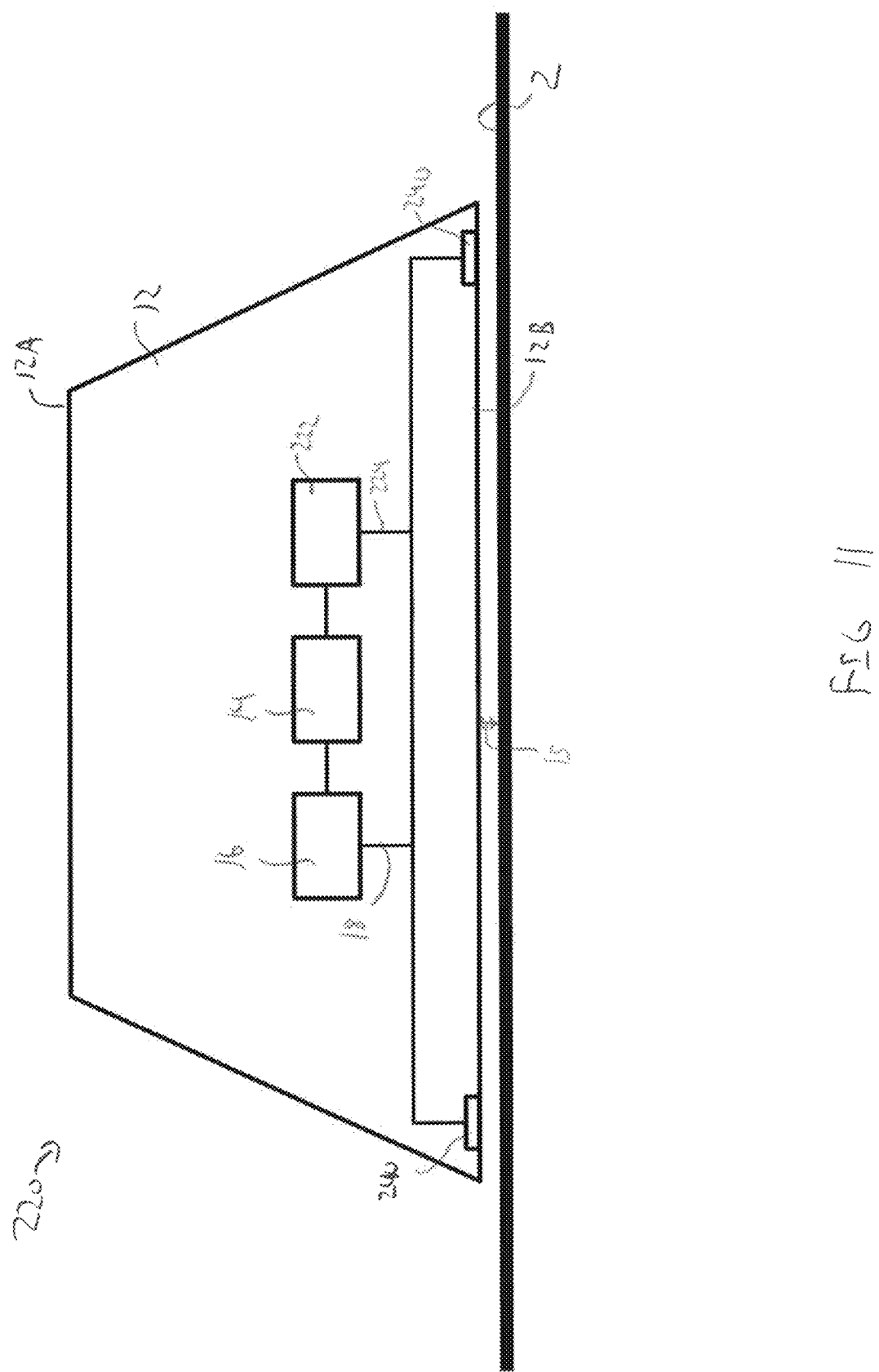
FIG. 11 is a schematic cross-sectional view of an embodiment of a vehicle comprising fluid bearings in accordance with principles disclosed herein.

Referring to FIG. 11, an embodiment of a hover vehicle 220 for travelling over a surface 2 and including fluid bearings 240 is shown. Vehicle 220 includes features in common with vehicle 10 shown in FIG. 1, and shared features are labeled similarly. Particularly, vehicle 220 includes a fuel source 222 for providing a combustible fuel stored therein to a plurality of fluid bearings 240 via fuel lines 224.

Figure 12:
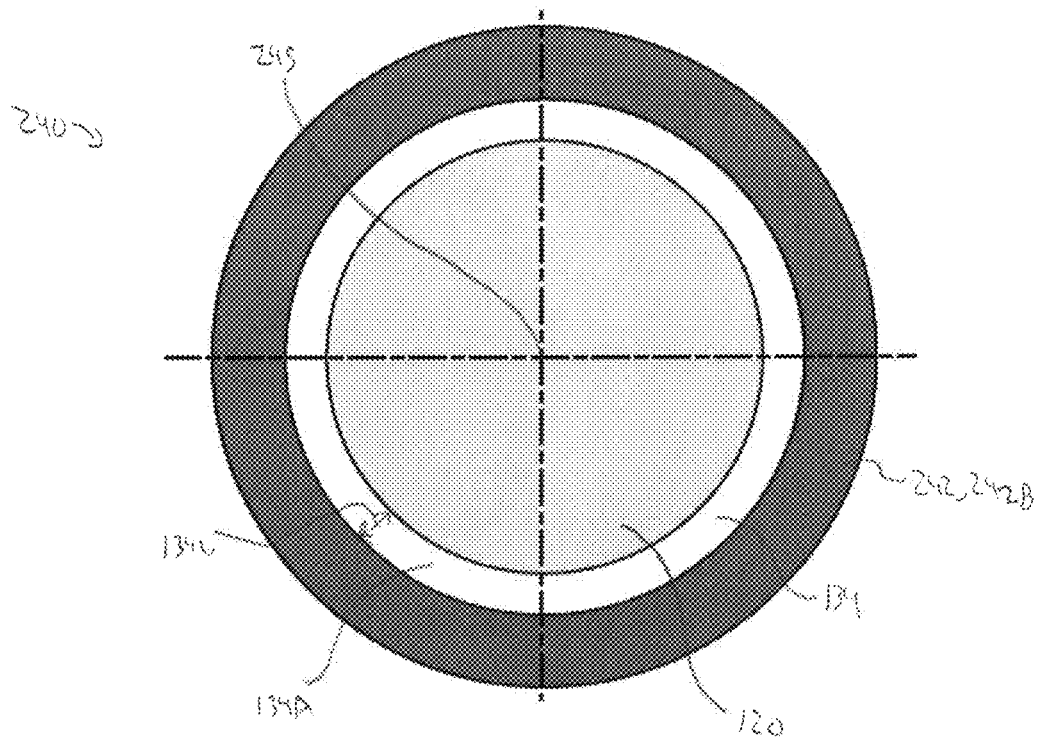
FIG. 12 is a bottom view of the fluid bearing of the vehicle of FIG. 11.
Figure 13:
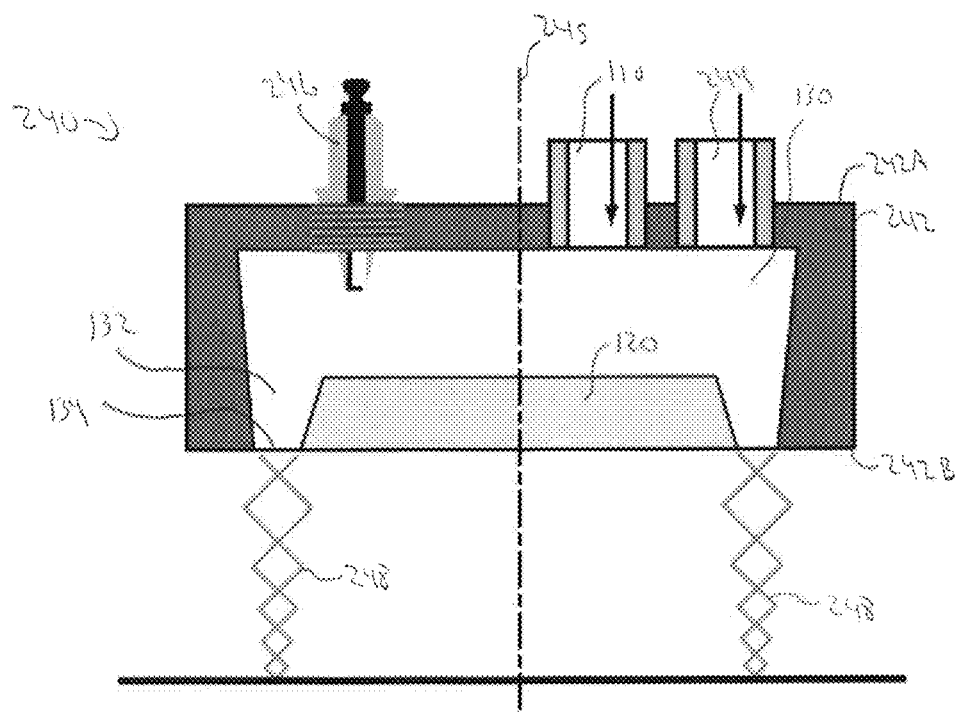
FIG. 13 is a side cross-sectional view of the fluid bearing of FIG. 12.

Referring to FIGS. 12 and 13, the fluid or gas bearing 240 of vehicle 220 is shown. Fluid bearing 200 includes features in common with fluid bearing 100 shown in FIGS. 2-6, and shared features are labeled similarly. In the embodiment of FIGS. 12 and 13, fluid bearing 240 has a central axis 245 (extending perpendicularly relative to cushion surface 120B of cushion member 120) and includes an outer housing 242 having a first or upper end 242A and a second or lower end 242B. Along with gas inlet 110, housing 242 includes a fuel inlet 244 for supplying fuel from fuel source 222 to plenum 130. Additionally, housing 242 includes an ignitor 246 configured to ignite or combust a mixture of gas and fuel disposed in plenum 130.

In some applications, the mass flowrates ṁ of gas required for levitation may be quite substantial, necessitating use of high pressure gas tanks for carrying the required mass of gas. However, fluid bearing 240 may reduce the mass requirements significantly by, instead of relying on simple isentropic flow for the creation of a sonic or supersonic jet, reacting gas with fuel supplied from fuel source 222 of vehicle 200 to combust the fuel and gas supplied from gas source 16 in response to spark ignition from ignitor 246. The ignited fuel and gas mixture may create a high pressure and temperature environment within plenum 130. Particularly, heat release due to combustion may result in significant increase in the fluid properties within plenum 130, including increases in temperature $T_o$, pressure $P_o$, and density ($\rho_o$) therein. Additionally, equation (2) above shows that for a fixed flowrate of gas ṁ and throat area 134A, an increase in temperature $T_o$ within plenum 130 due to combustion corresponds to an increase in pressure $P_o$ within plenum 130. Therefore, small mass flowrates of gas ṁ that may not result in choking at throat 134 without ignition may lead to a choked flow at throat 134 and the generation of supersonic curtain 159 after ignition from ignitor 246. Variation of the fuel stoichiometry inside fluid bearing 240 allows for variation of temperature $T_o$ in plenum 130, and therefore the ability to control pressure $P_o$ in plenum 130 (e.g., behaving as~the square root of plenum 130 temperature $T_o$), and in-turn, the length 151 of Mach diamonds 151 and the levitation height 15.

In some embodiments, a gas generator may be provided in lieu of supplying gas from gas source 16. For instance, part of plenum 130 may be constructed from a solid monopropellant material similar to that used in rocket motors. Upon ignition gas products of the reaction may be generated to create a high temperature and pressure environment in plenum 130. Those properties, along with the mass flowrate ṁ generated by the fluid bearing may be predicted using formulas from rocket science. A fluid bearing comprising its own gas supply could be used for hovering for short duration (e.g., in the order of a few tens of seconds), depending on the total charge (mass) of the propellant. Additionally, providing a fluid bearing with its own supply of gas may provide the advantage of not requiring an external tank (e.g., gas source 16), nor any associated equipment used for gas storage, relying instead on the high-density solid propellant charge to store the mass that will be converted into gas during combustion.

Figure 14:
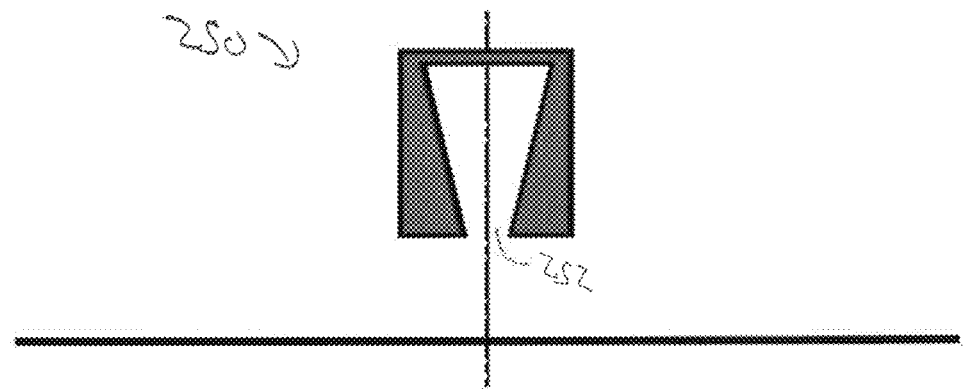
FIG. 14 is a side cross-sectional view of an embodiment of a fluid bearing in accordance with principles disclosed herein.
Figure 15:
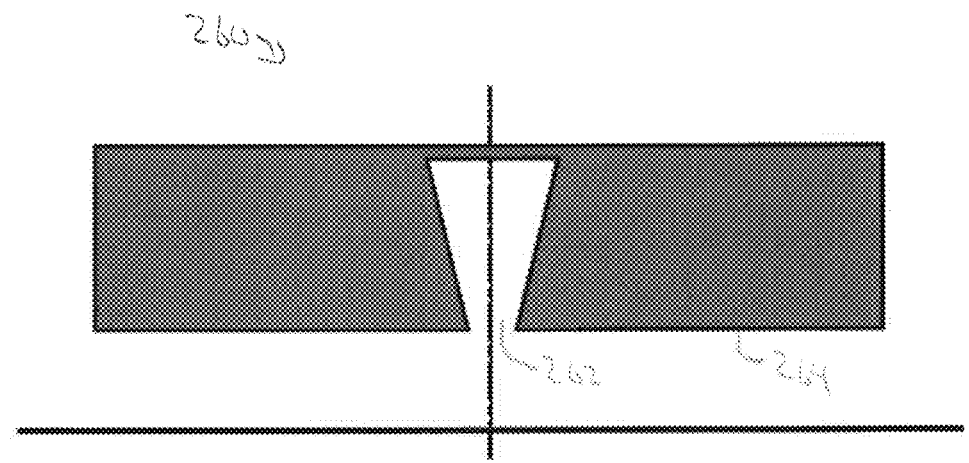
FIG. 15 is a side cross-sectional view of an embodiment of a fluid bearing in accordance with principles disclosed herein.
Figure 16:
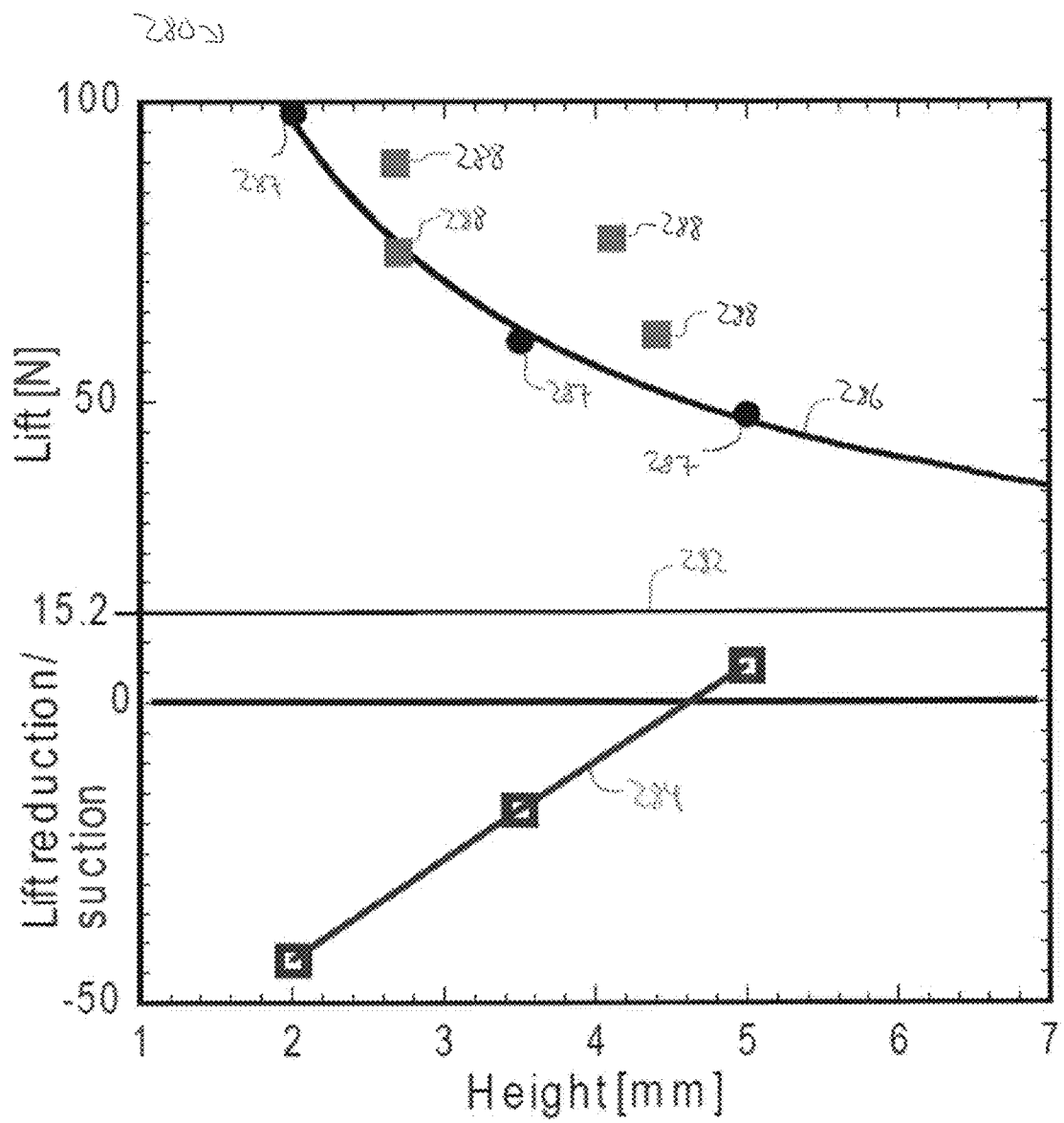
FIG. 16 is another representation of a CFD analysis of the fluid bearings shown in FIGS. 2, 3, 14, and 15.

Referring to FIG. 16, a graph 280 depicting comparisons between CFD analyses and experimental data pertaining to lift amplification due to the cushion effect of the supersonic curtain 159 of fluid bearing 100 is shown. Graph 280 contrasts the performance of fluid bearing 100 with a first central jet 250 shown in FIG. 14 and a second central jet 260 shown in FIG. 15. Particularly, first central jet 250 includes a central nozzle 252 for creating a sonic or supersonic jet 248. Second central jet 260 includes a central nozzle 262 for creating sonic jet 248, and, unlike central jet 250, also includes an annular cushion 264 disposed about and surrounding nozzle 262.

Graph 280 of FIG. 16 depicts lift/suction force (Newtons) on a Y-axis and levitation height 15 (millimeters) on an X-axis. Graph 280 includes a lift curve 282 of first central jet 250 and a lift curve 284 of second central jet 260, each estimated using flow simulations from CFD analyses. Additionally, graph 280 includes a lift curve 286 of fluid bearing 100 from CFD analyses and exemplary experimental data 288 provided by an exemplary embodiment of fluid bearing 100. Particularly, prototypes of fluid bearing 100 were constructed with different throat areas 134A, throat widths 134W, cushion areas 123, and cushion radii 125. A series of experiments were conducted so as to verify the validity of the concept and explore the fluid dynamical aspects of fluid bearing 100. Results of these experiments comprise the experimental data 288 of graph 280. Particularly, in the embodiment of FIG. 16, the throat area 134A of fluid bearing 100 comprises 52.5 millimeters squared (mm²), cushion area 123 comprises 1,600 mm², plenum pressure Po (e.g., pressure of the maximum total pressure region 162) of plenum 130 is 3 atmospheres, and the mass flow rate ṁ of gas supplied to fluid bearing 100 is 38.4 grams per second (g/s). In the embodiment of FIG. 16, the throat or exit area of central jets 250 and 260 (e.g., the area of the exit or throat of nozzle 252 and the area of the exit or throat of nozzle 262, respectively) are each also 52.5 mm². Additionally, in the embodiment of FIG. 16, the cushion area of second central jet 260 (e.g., the area of annular cushion 264) is 1,600 mm².

As shown in FIG. 16, neither of the central jets 250, 260, provide additional lift compared with fluid bearing 100. Additionally, in this embodiment, fluid bearing 100 does not produce suction (e.g., negative lift). First central jet 250 comprises a baseline case, where the lift generated by first central jet 250 is known from rocket science as the theoretical reaction thrust of a choked nozzle ($L_{th}$). Not being bound by any particular theory, the baseline case comprises two terms, the main "momentum thrust" ($L_{mom}$), and the secondary "pressure thrust" ($L_{press}$), which may be represented in a simplified form in the following equation (4), where $V_e$ is the exit sonic velocity (e.g., $V_e=(2\gamma T_o/(\gamma+1))^{1/2}$), and $P_e$ is the exit pressure calculated from equation (1):

$$L_{th}=L_{mom}+L_{press}=\dot{m}V_e+(p_e-p_a)A_e \quad (4)$$

In this embodiment, first central jet 250 generates a lift of 15.2 N irrespective of levitation height 15. Further, not being bound by any particular theory, the embodiment of fluid bearing 100 of FIG. 16 generates an amount of lift in excess of the baseline case (e.g., first central jet 250) from the cushion effect described above with respect to FIGS. 2, 3, and 4-6. Thus, not being bound by any particular theory, the lift generated by the embodiment of fluid bearing 100 of FIG. 16 may be represented, in a simplified manner, using the following equation (5):

$$L=L_{mom}+L_{press}+L_c=\dot{m}V_e+(p_e-p_a)A_e+L_e \quad (5)$$

The lift generated by the embodiment of fluid bearing 100 of FIG. 16, as estimated by the simplified model of equation (5), is represented on graph 280 by points 287. Thus, both the theoretical estimations indicated by points 287 and experimental data indicated by points 288, show a substantial cushion effect of the supersonic curtain 159 generated by fluid bearing 100. Additionally, in the embodiment of FIG. 16, while reducing the levitation height 15 of fluid bearing 100 results in increase of the cushion lift ($L_c$) in an almost inverse linear fashion (h≈1/h^{0.8}, where h=levitation height 15). Further, lift curve 282 of second central jet 260, where second central jet 260 comprises an inverse configuration (e.g., a central jet with surrounding annular cushion) to the configuration of fluid bearing 100 (e.g., annular jet with a central cushion), shows the presence of an opposite force, which results in lift reduction and even in the generation of a net suction (e.g., negative lift) when the levitation height is decreased substantially (e.g., levitation height of less than 5 mm). The suction effect produced by second central jet 260 corresponds to the detrimental effect of traditional hovering vehicles, sometimes referred to as "ground effect" in the art. Thus, unlike traditional hovering vehicles, fluid bearing 100 reverses the ground effect, thereby creating an aerodynamic curtain (e.g., supersonic curtain 159) that separates the cushion area from the surroundings, and substantially increases the lift generated by reaction between the aerodynamic cushion and fluid bearing 100. As described above, increasing the pressure in plenum 130, throat area 134A, and/or mass flowrate ṁ of gas may result in further increases of the generated lift produced by fluid bearing 100.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A fluid bearing, comprising:
   a housing including an internal plenum disposed in the housing and an inlet in fluid communication with the plenum, wherein the inlet is configured to provide fluid to the plenum from an external source;
   a cushion surface facing away from the housing and the plenum;
   one or more nozzles positioned between the cushion surface and the housing, wherein each nozzle comprises a converging section, wherein the one or more nozzles extend from the plenum to the surrounding environment, wherein the one or more nozzles are configured to produce an annular curtain of fluid flowing at a velocity of at least Mach 1 and disposed about the cushion surface in response to a fluid flow entering the plenum from the inlet.

2. The fluid bearing of claim 1, wherein the one or more nozzles comprises an annular nozzle extending about the cushion surface.

3. The fluid bearing of claim 2, wherein the annular nozzle comprises a converging annular nozzle.

4. The fluid bearing of claim 1, wherein the one or more nozzles comprises a plurality of circumferentially spaced nozzles disposed about the cushion surface.

5. The fluid bearing of claim 4, wherein each of the plurality of circumferentially spaced nozzles is a converging-diverging nozzle.

6. The fluid bearing of claim 1, further comprising an ignitor extending into the plenum, wherein the ignitor is configured to ignite the fluid entering the plenum.

7. The fluid bearing of claim 1, wherein the curtain of fluid is configured to provide an air cushion beneath the cushion surface that is at a pressure greater than the surrounding ambient pressure in response to a fluid flow entering the plenum from the inlet.

8. The fluid bearing of claim 1, wherein the curtain comprises a plurality of Mach diamonds.

9. The fluid bearing of claim 1, further comprising:
   a cushion member positioned in the plenum, wherein a bottom of the cushion member defines the cushion surface; and
   an actuator coupled to the cushion member and configured to adjust a lateral offset between a central axis of the cushion member and a central axis of the housing, wherein the central axis of the housing is oriented parallel to the central axis of the cushion member.

10. A hover vehicle for travelling over a surface, comprising:
    a chassis;
    a fluid source supported by the chassis; and
    a fluid bearing supported by the chassis and comprising one or more nozzles, wherein each nozzle each includes a converging section, and where the one or more nozzles are configured to produce an annular curtain of fluid flowing at a velocity of at least Mach 1 for levitating the hover vehicle above the surface in response to receiving fluid from the fluid source.

11. The hover vehicle of claim 10, wherein the fluid bearing comprises:
    a housing comprising an internal plenum disposed in the housing and an inlet in fluid communication with the plenum and the fluid source;
    a cushion surface facing way from the housing and the plenum; and
    the one or more nozzles positioned between the cushion surface and the housing, wherein the one or more nozzles extend from the plenum to the surrounding environment, wherein the one or more nozzles are configured to produce the annular curtain disposed about the cushion surface in response to a fluid flow entering the plenum from the inlet.

12. The hover vehicle of claim 11, further comprising:
    a fuel source supported by the chassis;
    wherein the fluid bearing comprises a fuel inlet in fluid communication with the fuel source and an ignitor extending into the plenum, wherein the ignitor is configured to ignite the fluid and fuel in response to fuel and fluid entering the plenum.

13. The hover vehicle of claim 11, wherein the curtain of fluid is configured to provide an air cushion beneath the cushion surface that is at a pressure greater than the surrounding ambient pressure in response to a fluid flow entering the plenum from the inlet.

14. The hover vehicle of claim 11, wherein the curtain of fluid comprises a plurality of Mach diamonds.

15. The hover vehicle of claim 11, wherein the fluid bearing comprises:
    a cushion member having a central axis and wherein a bottom of the cushion member defines the cushion surface; and
    an actuator coupled to the cushion member and configured to adjust a lateral offset between the central axis of the cushion member and a central axis of the housing, wherein the central axis of the housing is oriented parallel to the central axis of the cushion member;
    wherein the fluid bearing is configured to adjust an attitude of the vehicle in response to the actuator adjusting the lateral offset.

16. A method for levitating a vehicle travelling over a surface, comprising:
    suppling a fluid to an inlet of a fluid bearing of the vehicle;
    flowing the fluid into a plenum disposed in a housing of the fluid bearing;
    flowing the fluid through one or more nozzles extending from the plenum and into the surrounding environment; and ejecting the fluid from the one or more nozzles to form an annular curtain flowing at a velocity of at least Mach 1 and extending continuously around a cushion surface of the fluid bearing.

17. The method of claim 16, further comprising forming a fluid cushion enclosed by the curtain of fluid that is at a greater pressure than the surrounding ambient pressure.

18. The method of claim 16, further comprising forming a sonic jet comprising a plurality of alternating supersonic regions and subsonic regions.

19. The method of claim 16, further comprising adjusting the attitude of the vehicle by adjusting a lateral offset between a central axis of a cushion member comprising the cushion surface and a central axis of the housing, wherein the central axis of the housing is oriented parallel to the central axis of the cushion member.

20. The method of claim 16, further comprising igniting the fluid flowing into the plenum.

* * * * *